United States Patent [19]
Lancy

[11] 3,953,306
[45] Apr. 27, 1976

[54] METAL RECOVERY FROM WASTE TREATMENT SLUDGES

[75] Inventor: Leslie E. Lancy, Ellwood City, Pa.

[73] Assignee: Dart Environment and Services Company, Los Angeles, Calif.

[22] Filed: Oct. 3, 1973

[21] Appl. No.: 403,147

[52] U.S. Cl. .............................. 204/106; 204/112; 204/114; 204/120; 423/34; 423/35; 423/92; 423/104; 423/105; 423/127; 423/129; 423/140; 423/556; 210/59
[51] Int. Cl.² ...................... C01F 7/74; C25C 1/12; C25C 1/14; C25C 1/06
[58] Field of Search .......................... 423/144, 142, 423/150, 592, 140, 127, 129, 132, 556, 42, 27, 92, 98, 104, 105, 109; 210/42, 45, 43, 65, 66; 204/106, 114, 112, 120, 149, 152

[56] References Cited
UNITED STATES PATENTS

| | | | |
|---|---|---|---|
| 3,493,328 | 2/1970 | Niewenhuis | 210/45 |
| 3,725,266 | 4/1973 | Haviland | 210/45 |
| 3,787,306 | 1/1974 | Senior et al. | 423/144 X |

OTHER PUBLICATIONS
Chalyi et al., Chemical Abstracts, Vol. 59, No. 6011b.
Chalyi, Chemical Abstracts, Vol. 59, No. 9398Q.

*Primary Examiner*—Oscar R. Vertiz
*Assistant Examiner*—Brian E. Hearn
*Attorney, Agent, or Firm*—Fred S. Valles; Margareta LeMaire

[57] ABSTRACT

An improved process for preparing highly concentrated salt solutions of metals of high purity from waste metal sludges at superior dissolution rates is achieved by preparing, concentrating and washing the sludge containing insoluble metal hydroxide under specific conditions to safeguard against the solids being exposed to air or dried out. The wet sludge is then dissolved in a dilute acid. The resultant solution can be used directly e.g. as make up in many electrolytic metal finishing processes to compensate for drag out losses occurred, or as the primary metal source in electrolytic processes employing insoluble anodes. Other specific uses for the process include the preparation of aluminum sulfate coagulants.

17 Claims, No Drawings

METAL RECOVERY FROM WASTE TREATMENT SLUDGES

This invention pertains to the recovery of metal values from waste streams and in particular to the separate recovery of metals in a useful form.

Significant amounts of metal are lost from metal processing solutions employed in plating, pickling, etching, anodizing, chemical milling, or other metal finishing treatment systems. These processing solutions contain relatively high metal concentrations and substantial metal losses occur with the "drag-out" loss which is the film adhering to the work piece as it is removed from the metal finishing solution and which is rinsed off in a subsequent step. For example, an electroplating processing solution may contain 10–12 oz. of metal per gallon and 1½ to 3 gallons of this solution is the usual drag-out loss per 1,000 square feet of surface area processed. The regulatory requirements to precipitate these metals and remove them from the effluent stream to minimize pollution, create an even greater cost for the operation of these processes because the precipitated metal is in the form of thin slurry sludges and the removal of sludges to the waste disposal area is usually the most expensive part of the waste treatment operation. Additionally, the area in wich metal sludges are allowed to be deposited is continually shrinking, so the question is not only one of economy, but also the avoidance of a significant and sometimes insurmountable problem of ultimate disposal. In those cases where the metal of the precipated wastes are relatively high, the metal finishers often dry the slurries, which will convert at least a substantial portion of the metal compounds to the corresponding oxides, and accumulate the dried material in huge open-air storage piles. When sufficient quantities of these metal-containing powders have been accumulated to render recovery economical (e.g. after a year or even longer dependent on the size of the metal finishing operation), the metal values may be recovered by conventional chemical means. Commonly there is no effort made in segregating the dried wastes according to the nature of metals, and only the most valuable of the metal or metals present in the resulting mixed dried waste are recovered.

Heretofore, there were several problems associated with the economic recovery of the metal values from many of the metal processing waste streams. One such problem is that the dissolution time necessary to dissolve or convert the dried metallic compounds into solutions of sufficiently high concentration to be useful in the metal finishing process, is prohibitively high to permit integration of the metal recovery system into the processing scheme. Another major problem is that the purity requirements of many metal-containing processing solutions are extremely high, which prohibits the use of waste metals as a raw material source for the production of such solutions. As an example, most electroplating processing solutions contain the particular metal to be plated out without any significant contamination from other metals, because metallic contaminates are detrimental for the electroplating process, affecting the brightness, smoothness, and crystal structure of the deposit. A great deal of effort is expended in the direction of maintaining the purity of these processing solutions, usually extending into involved purification procedures to remove any buildup of solid or dissolved impurities. Such purification procedures include filtration to remove solid contaminats, plating out dissolved impurities at current densities different than that required for plating out the primary metal, etc.

Recently, considerable effort has been made towards improving the economics of waste treatment processes; however, they are mainly directed to conserving the utility requirements, especially water, in such processes. A particular interesting example of such a process is the integrated waste treatment system disclosed in "Metal Finishing" 1971, p. 774 – 776, Metals and Plastics Publication Inc., 99 Kinderkamack Road, Westwood, N.J., incorporated hereby as a reference and which system is described in some detail below:

The basic concept of this system is the segregation and treatment of the waste at the source. To accomplish this, the liquid film of processing solution which adheres to the part as it is removed from the bath is simultaneously treated and removed from the processed part. The waste treatment is integrated into the processing sequence and no separate treatment plant is required. The system can be employed following any processing step which would result in toxic waste carry-over, regardless of its position in the processing line.

In operation, a treatment wash tank is substituted for the first rinse tank following the metal finishing operation. A treatment wash solution is continuously recirculated through this tank and physically removes the dragout, at the same time reacting chemically with it. The part is then rinsed with fresh water in the subsequent rinse tank. The effluent from this rinse tank is now uncontaminated with toxic dragout or precipitated metal compounds and requires no additional treatment. The treatment solution is continuously recirculated between the treatment wash tank and a larger reservoir. The reservoir tank serves three major functions:

1. It is the all-important buffering component in the system which neutralizes the shock load caused by sudden and irregular changes in the quantity of processing solution dragout treated.
2. It serves as a clarifier, settling out the insoluble metal compounds formed in the first stage of the reaction.
3. It serves as a retention tank, providing adequate time for the desired chemical reaction.

Only one reservoir tank is required and several treatment wash tanks can be served by a common reservoir tank. The precipitated sludge is then removed for conventional disposal or accumulation as described above.

It is therefore, an object of this invention to provide a process which permits economic recovery of waste metals into useful products.

Another object of this invention is to provide a process for the production of concentrated metal salt solutions from precipitated metal sludges at high dissolution rates.

Still, another object of the invention is to provide a waste metal recovery process which can be integrated in a metal finishing process.

These and other objects will become apparent from the detailed description given below.

It has not been found quite unexpectedly that the speed and ease of redissolution of waste metal compounds in solutions of low free acid concentration depend upon the past history of these compounds and that a several-fold increase in the rate can be achieved provided that certain conditions are observed. It is a critical feature of this invention that during the workup of the waste streams including precipitation, concentration, washing and optional storage which are the common process steps prior to the dissolution, at least a slight supernatant aqueous layer is always maintained above the surface of each of the metal sludges when settled. However, when these conditions are not observed such as by allowing the solids to be filtered to substantial dryness or to be dried either in air or by heat, the rate of dissolution is markedly lower which severely limits the use of conventional dried waste for recovery and prohibits electrolytic recovery thereof since the dissolution is too slow to replenish the metal that is won in the metallic form at the cathode.

The invention is particularly applicable to the recovery of nickel, tin, copper, cadmium, zinc and aluminum from various metal processing waste streams but is also useful for the recovery of many other metals. Care should be taken to segregate the waste streams such that only one metallic compound is present in each stream, in order to provide for recovery of the metal values in an acceptably pure form. Using deionized water for the make-up of the precipatant solution will even keep the calcium and magnesium salts out of the sludges even though these metals are common in the water sources. In case calcium salts are used as precipitant, naturally only the magnesium incorporation into sludge would be avoided. Thus, any of the rinses employed to remove the film adhering to a workpiece after removal from a metal processing bath are suitable in this process and in particular sludges collected in an integrated waste treatment system as described above are especially suitable raw material source. However, many other waste streams containing a metallic compound in solution are also equally suitable.

A precipitant is added to the waste stream or as the chemical rinse in the integrated waste treatment system in sufficient quantity to precipitate the metal as the corresponding hydroxide or carbonate. The nature of the waste stream dictates whether the precipitant should be alkaline or acid. For instance, many of the metal processes employ solutions of simple or complex metal salts, e.g., nickel, copper, zinc and cadmium, and in such cases the precipitant should be alkaline. In the case of cyanide containing solutions the alkaline treatment is accompanied by a treatment for the conversion of the toxic compounds into harmless products which can subsequently be safely disposed of without any pollution problem. Any inorganic alkaline solution may be used as the precipitant such as solutions of ammonium hydroxide or of the alkali metal hydroxides, carbonates or bicarbonates. Of the latter three groups, the sodium and potassium compounds are preferred, since their corresponding salts generated in the precipitation are water soluble and can be washed out of the sludge.

Other metal processing waste streams containing dissolved metallic compounds are also available in alkaline form, e.g. alkaline solutions of aluminate, zincate or stannate. In these cases the precipitant should be an acid, preferably sulfuric or hydrochloric acid in order to precipitate the metal in the hydroxide form.

The amount of precipitant is not a critical feature of this invention and can easily be determined in any situation by simple laboratory experiments.

Since the concentration of the metal values in the waste streams are usually quite low, the slurry formed by the precipitation is very thin. The slurry is therefore "thickened" or concentrated by removal of a portion of the aqueous phase, which can be carried out by any conventional means provided that when the thickened slurry has settled there reamins at least a thin layer of supernatant liquid above the surface of the settled solids. A simple decantation technique is preferred, however, it is also within the scope of this invention to concentrate the slurries using other separation methods such as by centrifugation, filtration or even distillation, provided that the thickened slurry or sludge is not permitted to be dried out or the solids be exposed to the air.

The thickened slurry is then subjected to at least one washing with water or slightly acidified water, having a pH above about 4 if alkalinity has to be washed out of the sludge, or slightly alkaline water, having a pH below about 9 if acid remains have to be removed. The purpose of the washing is to remove substantially all excess precipitant as well as other soluble compounds present in the slurry. The acidic pH of the rinse water should not create resolubilization of the washed metal because under these conditions the wash waters would be considered toxic for the environment. The same consideration would apply to with an alkaline wash solution following an acidic precipitation step and in general a pH of 9 or less will be suitable. An alkaline or acid wash may be followed by a subsequent neutral wash, if desired. The use of deionized water for the washes to avoid calcium and magnesium contamination of the sludge is preferred, but not necessary. The process of washing is most economically carried out by re-suspending the sludge in the wash water in an agitated vessed allowing the solids to settle and then decanting the wash water from the vessel, but leaving sufficient water in the remaining sludge to at least cover the surface of the solids with a film of water. Any of the other techniques for water separation discussed above in connection with the thickening of the precipitated slurry are also feasible provided that again the required amount of water remains in the washed sludge.

The washed sludge is subsequently acidulated with an acid-containing solution to maintain a pH broadly in the range of about 1 to about 5.5 and usually in the range from about 2.9 to 5.5. Inorganic or organic acids may be used in the acidulation. Examples of such acids are sulfuric acid, hydrochloric acid, nitric acid, fluoboric acid, phosphoric acid, sulfamic acid and the like. For the purpose of simplicity, the invention will be discussed hereinafter in terms of redissolution with sulfuric acid. The metal hydroxide or carbonate in the sludge reacts with the acid and the resultant salt is dissolved. As the reaction proceeds, the acid will be neutralized by the dissolution of metal solids causing an increase in the pH. Additional acid solution is then added for maintenance of the pH within the desired range. The dissolution should preferably be carried out with vigorous agitation, provided e.g., by means of mechanical stirrers, by recirculation of the liquid solution through the sludge or both. Although any temperature between ambient temperature and the boiling point of the solution can be employed in this process step, it is advantageous to maintain elevated temperatures such as between about 120° and 160°F to assure a relatively high rate of dissolution. In general, there is no maximum limit for the amount of water that can be tolerated in this process step and consequently, there are no specific limits that can be set as to the initial water content of the slurry or to the acid fed to the step. For instance, with a relatively dilute sludge, a more concentrated acid can be used for controlling the pH in the range of 1 to 5.5. However, in order to obviate subsequent costly concentration steps and directly obtain a commercially useful product of high metal concentration, it is preferred that the sum of the water initially present in the slurry and that added as acid solution does not exceed that required to achieve the desired metal concentration of the product solution. Usually, it is therefore desired to carry out the dissolution until the concentration of dissolved metal salt has reached at least the concentration necessary for it to be stored or shipped without crystallization or freezing occurring in the storage or shipping vessel. After dissolution to the desired metal concentration is achieved the solution is withdrawn as a product stream, suitably by means of an overflow arrangement to minimize entrainment of solids. The solids are advantageously removed by passing the product solution through one or more filters.

The materials of construction used in any of the vessels, pipes or other in-line process equipment used in the present process, should be such that no significant contamination of the process streams will occur therefrom. The product solution can subsequently be (a) sold as such as a commercial product, (b) used directly as a metal processing solution or (c) the metal values can be recovered therefrom in metallic form by electrowinning techniques or (d) the salts can be crystallized from the solution by any known technique. The ultimate disposal depends largely upon the value of the metal recovered but also on whether there is a ready market for the product solution without further processing. For instance, many metal finishing processes employ metal sulfate processing baths, e.g., solutions of nickel sulfate, zinc sulfate and the like, having pH values and metal concentrations in the same range as that of the solution produced by the method of the instant invention. Nickel sulfate plating solutions could be operated in a pH range of 1 to 5.5 and a salt concentration calculated as the metal of about 50 to 120 g/liter, zinc and copper sulfate plating solutions in the same pH range at concentration of about 25–100 g/l. Tin acid plating baths (fluoboric acid) usually have a pH of about 1 to about 4 and contain 100–200 g/l of tin.

As mentioned above, such solutions are readily produced by the method of the present invention.

Concentrated aluminum sulfate solutions prepared in accordance with the invention can be sold as coagulants to water works, sanitary sewage treatment plants or other industrial processors requiring aluminum sulfate as coagulant to add to process water or water streams. Commercial solutions of this type typically contain about 275 grams per liter aluminum sulfate or about 44 grams per liter as aluminum. Since some calcium sulfate content is not deleterious in using aluminum sulfate coagulant solutions, the precipitation of aluminum hydroxide can be accomplished using lime as a precipitant when using acid aluminum-containing waste streams as the source of raw material for the recovery process. Dissolution of the aluminum from the sludge would then leave behind a preponderant part of the calcium sulfate formed in the reaction as an insoluble sludge.

A number of electroplating processes operate with anodes of the plating metal, the anode serving as the source for replenishing the metal ions in the plating solution as the metal is being plated out therefrom. Heretofore, it has not been technically or economically feasible to replace such anodes with insoluble anodes such as lead, platinized titanium or other insoluble anodes, and use waste metal oxides as the source for the metal ions, due to the very low dissolution rates of the metal oxides in low free acid containing solutions required for the preparation of plating solutions. However, due to the significantly higher dissolution rates encountered in the process of the present invention, the gap between the rates of dissolution and plating has been decreased to the point that the aforementioned replacement can be carried out at acceptable plating efficiencies. One advantage of this system is that it can be operated continuously, while using low cost raw material and does not require periodic shutdowns for replacement of consumed anodes which are costly procedures both in terms of required manpower and in terms of operating costs of high purity anodes. Such a system is advantageously operated in the general manner set forth below. The acid solution required for the dissolution of the metal sludge is in this case the plating solution itself withdrawn all or in part from the plating bath after said solution has been depleted of metal ions and reqires replenishment. This condition is easily measured by pH determination, the pH dropping due to the increase in free acid concentration. The depleted plating solution is then allowed to circulate through the dissolution vessel for replenishment of metal values and the circulation is discontinued when pH measurements indicate that sufficient quantities of the free acid have been neutralized by dissolution of the metal solids. The plating solution then by-passes the dissolution vessel.

The plating solution usually contain various brighteners, buffers etc., the presence or absence of which appear to have no effect on the rate of dissolution. The sludge is periodically replenished in the dissolution vessel to maintain a sufficient inventory herein at all times. This process can easily be made entirely continuous by the provisions of automatic valves responsive to pH measurements, properly sized vessels optionally including holding tanks for plating solution withdrawn from the dissolution vessel, etc. to operate within some predetermined pH range. Such adaptions can easily be made by anyone skilled in the art and need not be discussed therefore in any further detail. This embodiment of the present invention pertaining to the use of insoluble anodes and a metal sludge as the source for the metal being plated out, is generally applicable to many plating processes employing various acid metal plating solutions. It has been found to be particularly useful, however, when applied to the recovery of low-value metals such as zinc, from waste sludges, thereby avoiding the expense associated with other possible recoveries, such as by electrowinning or chemical methods. In case there is an insufficient supply of metal in the form of waste metal sludge to carry out the metal plating process, only some of the anodes should be of insoluble type which the remaining should be soluble, i.e. the same as the plating metal.

In another embodiment of the invention carried out in a manner substantially similar to that of the embodiment discussed immediately above, the metal values in the sludge are electrolytically recovered at the cathode of the electroplating bath as pure metal. The specific conditions used in such electrowinning processes and techniques in removing the recovered metal from the cathode are well known in the art and need not be discussed in any further detail. Electrowinning of metals from waste sludges are particularly advantageous in those cases where the metal values are high and also where there is no readily available market for the acid solution as such. Thus, many metals can be recovered in metallic form using concentrations of the invention, especially nickel, tin, copper, cadmium and the like.

The following examples are presented to illustrate the invention:

EXAMPLE 1

Two nickel sulfate solutions were prepared, one containing 26 g/l of nickel calculated as the metal and 50 g/l of boric acid as a brightener and the other containing 75 g/l of nickel calculated as the metal and 50 g/l of boric acid. A nickel sludge obtained from a commercial plant containing 4.9 wt. percent nickel hydroxide was washed with deionized water until neutral and the wash water was decanted leaving a supernatant liquid layer above the surface of the settled solids. The solids content of the washed sludge was about 8.4 percent. A portion of the washed sludge corresponding to 1gm of dry solids was added to 100 ml. of the prepared nickel sulfate solution containing 26 g/l nickel. The mixture was stirred and maintained at a temperature of 140°F. The pH was adjusted to 3.0 with 1.0 N sulfuric acid and maintained at this pH with further additions of acid during the length of the experiment. When no further addition of sulfuric acid was needed to maintain the pH at 3.0 the extraction of nickel was assumed complete and the time for the extraction was recorded. The example was repeated but using the more concentrated nickel sulfate solution containing 75 g/l of nickel. In both experiments the nickel content was removed within a ten minute period. The comparative experiments showed than an increase in the nickel content of the extracting solution did not retard the leaching of nickel from wet sludge and that the preparation of concentrated solutions are easily carried out.

Vastly different results were obtained when extractions of air-dried sludge were attempted using the same nickel sulfate solutions, identical conditions of temperature and pH. The air dried sludge was prepared by air drying a portion of the wet sludge for several days until it was hard but still moist. It had a solids content of about 31.6 wt. percent. Portions of this air dried sludge, each corresponding to 1gm. of dry solids, were added to each of the sulfate solutions and the times to achieve complete extraction of the nickel were again recorded. The time required for extracting the air dried sludge with the 26 g/l nickel solution was now 45 minutes, i.e., 4.5 times as long as required for the extraction of the same amount but in wet sludge form. Even a more dramatic difference was noticed comparing the extractions with the more concentrated nickel sulfate solution (75 g/l nickel) in that the air dried sludge now required a reaction period of 125 minutes as opposed to 10 minutes for the wet sludge.

EXAMPLE 2

The comparative experiments described below demonstrate the superior results obtained in preparing highly concentrated aluminum sulfate solutions in accordance with the invention. A thin sludge containing aluminum hydroxide was washed as in the previous example. A portion of the wet washed slurry containing 33.5 wt. percent dry solids was retained for one set of experiments while another portion was ovendried before using. For each experiment a 5.0 gm. sample based on dry weight was used and deionized water was added to the ovendried portions to equal the weight of the water of the wet sludge portions in order to assure equal starting volumes in each example. Solutions of aluminum sulfate were prepared having varying initial concentrations, which are shown in the table below. The temperature of each solution during the experiments, which each lasted 60 minutes, was maintained at 140°F and the pH was maintained at 2.9 by addition of 1.0 N sulfuric acid. To one 100 ml aliquot of each solution was added under agitation a sample of the wet sludge (5 gm dry weight) and to another the same amount but prepared from ovendried sludge as described above. After 60 minutes each experiment was discontinued, the liquids were filtered, diluted to 200 ml and analyzed for aluminum content. The final aluminum concentrations were based on the aluminum uptake of the original 100 ml aluminum sulfate samples. As shown in the table below the final aluminum concentrations of the solutions prepared from wet sludge were consistently higher than those prepared from ovendried sludges.

| Experiment | | Initial Aluminum Conc. in Grams Per Liter | Final Aluminum Conc. in Grams Per Liter |
|---|---|---|---|
| A1 | Wet Sludge | 34.67 | 40.34 |
| A2 | Dry Sludge | 34.67 | 39.66 |
| B1 | Wet Sludge | 39.66 | 46.94 |
| B2 | Dry Sludge | 39.66 | 45.18 |
| C1 | Wet Sludge | 39.39 | 46.94 |
| C2 | Dry Sludge | 39.39 | 43.16 |
| D1 | Wet Sludge | 41.95 | 49.64 |
| D2 | Dry Sludge | 41.95 | 48.56 |
| E1 | Wet Sludge | 42.22 | 49.38 |
| E2 | Dry Sludge | 42.22 | 48.42 |

EXAMPLE 3

This experiment demonstrates the superior results obtained when dissolving wet aluminum sludge versus ovendried sludge in terms of relative rates of dissolution. A sample containing 10 gms. of the ovendried material of Example 2 was added to 100 ml of a stirred aluminum sulfate solution containing approximately 43 g/l of aluminum calculated as the metal. The solution initially had a pH of 3.0 and the temperature was maintained at 140°F during the experiment. After the addition of the dried sample, a decrease in pH was noted. The pH stabilized at 3.2 and the time to reach stabilization was 4 minutes.

The experiment was repeated but using a sample of the wet sludge of Example 2 corresponding to 10 gm dry weight. The time to reach a final pH of 3.2 was now only one minute, which indicates that the rate of dissolution of wet sludge was about 4 times greater than that of ovendried sludge.

It is to be understood that many alterations and modifications can be made to the process of this invention falling within the spirit thereof and scope of the appended claims.

What is claimed is:

1. In a process for the recovery of metal values from waste metal streams wherein a precipitant is added to said waste metal stream to form a dilute aqueous slurry of metal compound solids selected from metal hydroxide or metal carbonate, the slurry is concentrated by removing a portion of the aqueous phase and the metal compound solids are dissolved in an acid, the improvement which comprises:

washing the concentrated slurry in at least one step to remove soluble compounds;

maintaining a sufficient amount of water at all times during each of the concentration and washing steps to provide a supernatant aqueous phase above the upper surface of the solids when settled; and maintaining the pH during the dissolution of said metal compound solids in the acid in the range from about 1 to about 5.5.

2. A process according to claim 1 wherein the metal values are selected from nickel, copper, tin, cadmium, zinc or aluminum.

3. A process according to claim 1 wherein the waste stream is acid and the precipitant is an alkali selected from alkali metal hydroxide, bicarbonate or carbonate.

4. A process according to claim 1 wherein the alkali metal hydroxide, bicarbonate or carbonate is selected from sodium or potassium hydroxide, bicarbonate or carbonate.

5. A process according to claim 3 wherein the concentrated slurry is washed with slightly acid water of a pH of at least about 4.

6. A process according to claim 1 wherein the concentrated slurry is washed with deionized water.

7. A process according to claim 1 wherein the precipitant is prepared by dissolution in deionized water.

8. A process according to claim 1 wherein the pH is maintained between 2.9 and 5.5.

9. A process according to claim 1 wherein the portion of the aqueous phase removed in the concentration of the slurry is removed by decantation.

10. A process according to claim 1 wherein the washing step is carried out by reslurrying the concentrated slurry in an aqueous medium, allowing the solids to settle and decanting the aqueous medium from the slurry.

11. A process according to claim 1 wherein the dissolution is carried out at temperatures between about 120°F and about 160°F.

12. A process according to claim 1 wherein the acid employed in the dissolution is a solution containing sulfuric acid.

13. A process according to claim 1 wherein the waste stream comprises the liquid film adhering to a work piece after removal from a metal finishing bath and the acid solution of the metal compound resulting from the dissolution is returned to said bath as make up.

14. A process according to claim 1, wherein the waste stream contains a soluble aluminum compound and the precipitant is lime, the acid is a solution containing sulfuric acid, and a concentrated solution of aluminum sulfate is recovered from the process.

15. A process according to claim 1 wherein the metal value is nickel.

16. A process according to claim 1 wherein the acid employed in the dissolution is a depleted metal salt solution containing free acid and is withdrawn from an electrolytic process employing at least one insoluble anode, at least one metal plating cathode and said metal salt solution, which becomes depleted in metal salt and more concentrated in free acid during the course of the electrolytic process, and wherein after dissolution the resulting metal salt repleted solution is returned to the electrolytic process.

17. A process according to claim 16 wherein the metal salt is selected from salts of nickel, copper, cadmium, tin or zinc.

* * * * *